United States Patent
Wang

(10) Patent No.: US 8,495,821 B2
(45) Date of Patent: Jul. 30, 2013

(54) SHEET STACK THICKNESS ESTIMATING DEVICE

(75) Inventor: Ching-Tse Wang, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 278 days.

(21) Appl. No.: 13/105,614

(22) Filed: May 11, 2011

(65) Prior Publication Data

US 2012/0222325 A1    Sep. 6, 2012

(30) Foreign Application Priority Data

Mar. 4, 2011   (TW) .............................. 100107360 A

(51) Int. Cl.
*G01B 5/02*    (2006.01)

(52) U.S. Cl.
USPC ............................. 33/549; 33/833; 270/58.09

(58) Field of Classification Search
USPC .. 33/549, 732, 783, 784, 832, 833; 270/58.09
See application file for complete search history.

(56) References Cited

U.S. PATENT DOCUMENTS

| | | | | |
|---|---|---|---|---|
| 3,834,031 A | * | 9/1974 | Muller | 33/549 |
| 5,575,075 A | * | 11/1996 | Sasaki | 33/501.02 |
| 5,599,009 A | * | 2/1997 | Mandel et al. | 270/58.09 |
| 6,773,004 B2 | * | 8/2004 | Obregon et al. | 270/58.09 |
| 6,865,818 B2 | * | 3/2005 | Petrowich | 33/501.02 |
| 7,637,025 B2 | * | 12/2009 | Lee | 33/783 |
| 8,121,391 B2 | * | 2/2012 | Duss | 382/141 |
| 2006/0191154 A1 | * | 8/2006 | Kraemer | 33/832 |
| 2011/0031675 A1 | * | 2/2011 | Terao | 270/58.09 |
| 2013/0067760 A1 | * | 3/2013 | Husted | 33/784 |

* cited by examiner

*Primary Examiner* — G. Bradley Bennett
(74) *Attorney, Agent, or Firm* — Kirton McConkie; Evan R. Witt

(57) ABSTRACT

The present invention relates to a sheet stack thickness estimating device including a driving device, a first connecting rod, a second connecting rod, a pressing part and a sensor. The driving device provides a motive force to the sheet stack thickness estimating device so as to drive the first connecting rod moved horizontally for rotating the second connecting rod, so that the pressing part presses the sheets on the paper tray. By detecting if the signal generated by the sensor is blocked by the first connecting rod, the thickness estimating device can judge if the thickness of the sheets exceeds a predetermined value.

7 Claims, 9 Drawing Sheets

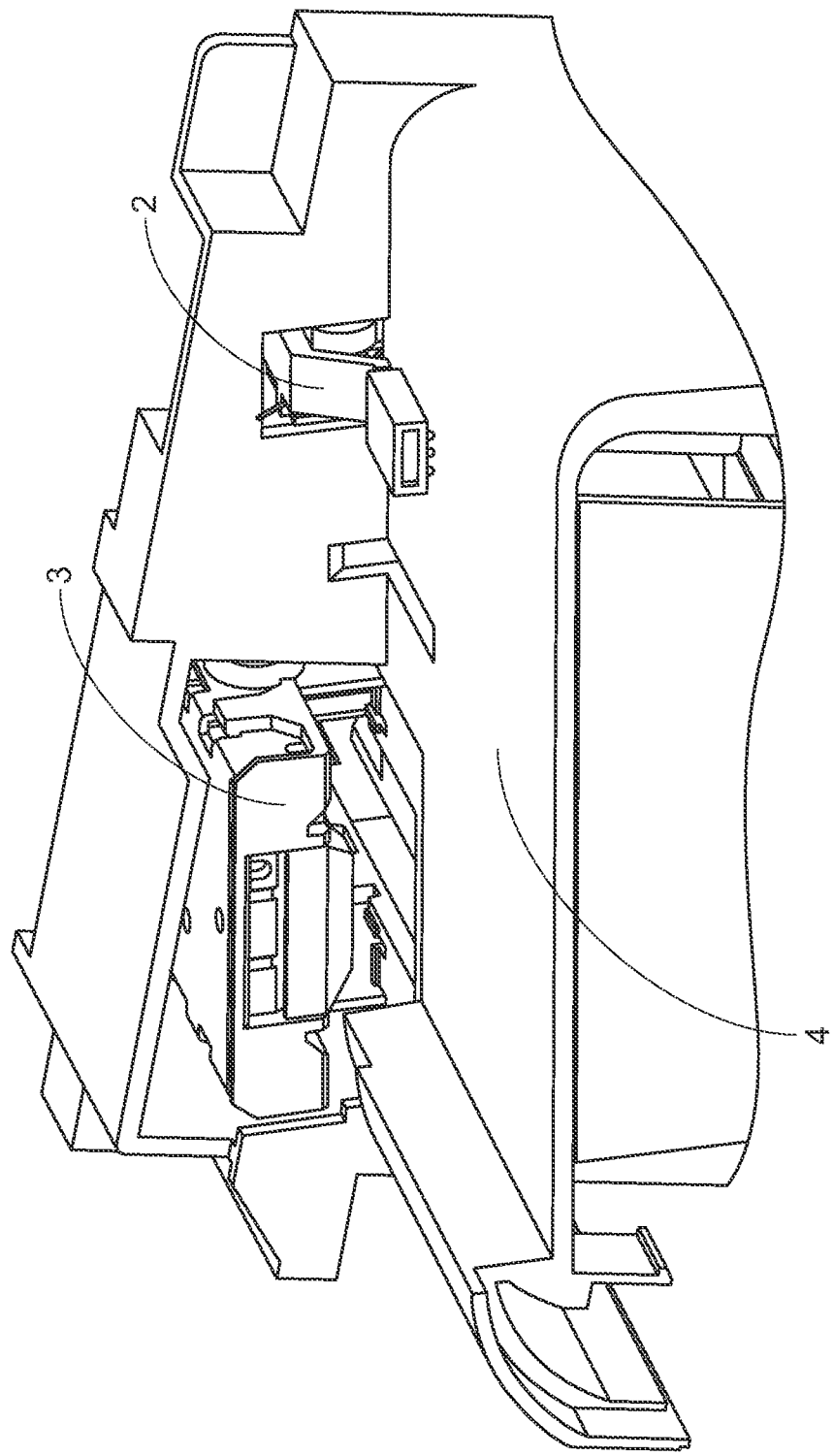

SHEET STACK THICKNESS ESTIMATING DEVICE

FIELD OF THE INVENTION

The present invention generally relates to a sheet stack thickness estimating device, and more particularly to a sheet stack thickness estimating device for an office machine.

BACKGROUND OF THE INVENTION

Printers, scanners, and so on are common office machines in the office. In order to enhance the convenience of use, an additional subsequence processing device, such as a stapler or a punch, is generally equipped with the office machines in recent years, so as to automatically process the sheets according to the requirement of the users before the sheets are outputted from the office machines. However, both of the stapler and the punch have various sizes for the sheet stacks with different thickness. If the sheets on the paper tray are thicker than a processing limitation of the stapler or the punch, not only the sheets but also the subsequence processing device may be damaged. Thus, a sheet stack thickness estimating device is usually equipped for ensuring the thickness of the sheets on the paper tray is lower than a presetting thickness to avoid the above mentioned damages.

FIG. 1A illustrates a schematic view of a conventional sheet stack thickness estimating device disclosed in the U.S. Pat. No. 6,773,004. The sheet stack thickness estimating device 1 in FIG. 1A comprises a driving device 11, a first connecting rod 12, a second connecting rod 13, a shaft 14, a pressing part 15, an elastic component 16 and a sensor 17. The first connecting rod 12 connects to the driving device 11. The second connecting rod 13 comprises a front portion 131, a middle portion 132 and an end portion 133. Here, the front portion 131 and the end portion 133 are respectively perpendicular to the middle portion 132, the front end 131 connects to the first connecting rod 12 and is pivoted to the shaft 14, and the shaft 14 is disposed on a frame 18. The pressing part 15 connects to the end portion 133 of the second connecting rod 13. The elastic component 16 connects between the frame 18 and the second connecting rod 13. The sensor 17 is disposed above the middle portion 132 of the second connecting rod 13.

Also referring to FIG. 1A, when the front edge of the sheet S is entering towards the paper tray 19, the driving device 11 drives the first connecting rod 12 to move towards the driving device 11 horizontally. Hence, the first connecting rod 12 pulls the front portion 131 of the second connecting rod 13, so as to drive the second connecting rod 13 rotates about the shaft 14 in the counterclockwise direction, and thus the second connecting rod 13 is raised to a first position (as the dashed line illustrated in FIG. 1A). At this time, the pressing part 15 is distant from the paper tray 19.

After whole of the sheet S enters into the paper tray 19, the driving device 11 stops to drive the first connecting rod 12 to move. Hence, the first connecting rod 12 stops to pull the front portion 131 of the second connecting rod 13, and thus the second connecting rod 13 is driven by a return force provided by the elastic component 16 to rotate about the shaft 14 in the clockwise direction until the second connecting rod 13 is lowered to a second position (as the continuous line illustrated in FIG. 1A) to let the pressing part 15 lean against the sheets S on the paper tray 19. At the same time, the second connecting rod 13 also pulls the first connecting rod 12 to move back towards the driving device 11 horizontally. As shown in FIG. 1A, after a stack of sheets S need to be processed are all entered into the paper tray 19 and the thickness thereof is lower than a presetting thickness, the middle portion 132 of the second connecting rod 13 does not interrupt the sensor 17, and then the controller 1a controls the subsequence processing device (not shown), such as a stapler or a punch, to bind or to punch the stack of sheets S.

FIG. 1B illustrates a side view of the conventional sheet stack thickness estimating device where a stack of sheets are entered into the paper tray thereof. Referring to FIG. 1B hereinafter, after a stack of sheets S need to be processed are all entered into the paper tray 19 and the thickness thereof is thicker than the presetting thickness, the middle portion 132 of the second connecting rod 13 interrupts the sensor 17, and then the controller 1a determines to stop binding or punching the stack of sheets S by the subsequence processing device (not shown), such as a stapler or a punch.

Accordingly, the sheet stack thickness estimating device 1 may detect whether the thickness of a stack of sheets S on the paper tray 19 is lower than the presetting thickness or not by the driving device 11, the first connecting rod 12, the second connecting rod 13, the pressing part 15 and the sensor 17.

However, the conventional sheet stack thickness estimating device 1 has problems as below. As described above, the sensor 17 must be disposed on the frame of the office machine above the sheet stack thickness estimating device 1. Therefore, the sheet stack thickness estimating device 1 is not only difficult to be modulized and utilized in the office machines with various sizes, but also requiring larger vertical installation space. Further, the sensor 17 must be distant from the shaft 14 for increasing a detectable range of the sheet stack thickness, and thus requiring larger horizontal installation space as well. In addition, the probability of generating an interruption signal before the sensor 17 being completely interrupted by the second connecting rod 13 is increased due to the moving direction of the second connecting rod 13 is perpendicular to the sensor 17, and thus it is likely to result in a misjudgement by the sheet stack thickness estimating device 1.

Accordingly, it is necessary to provide a novel sheet stack thickness estimating device to overcome the above mentioned problems of the conventional stack thickness estimating device.

SUMMARY OF THE INVENTION

The present invention is directed to a modulized sheet stack thickness estimating device with higher accuracy.

In a preferred embodiment, the present invention provides a sheet stack thickness estimating device for detecting a thickness of a stack of sheets on a paper tray, comprising:

a driving device, for providing a motive force to the sheet stack thickness estimating device;

a first connecting rod, comprising a notch, wherein the first connecting rod connects to the driving device, so as to be driven to move horizontally by the driving device;

a second connecting rod, wherein a first end of the second connecting rod connects to the first connecting rod and is synchronized with the first connecting rod, and a second end of the second connecting rod is pivoted to a shaft and is capable of rotating about the shaft;

a pressing part, for pressing the stack of sheets on the paper tray, wherein the pressing part is extended from the second end of the second connecting rod; and a sensor, comprising an emitting end and a receiving end, wherein the emitting end and the receiving end are respectively located at two side of the first connecting rod.

In a preferred embodiment, the driving device comprises a coil rack, a pillar and a position limiting plate, wherein the coil rack has a through hole therein, the pillar is inserted inside the through hole of the coil rack with an end of the pillar exposed outside the coil rack, and the position limiting plate surrounds the end of the pillar.

In a preferred embodiment, an included angle substantially equal to 90 degrees is formed between the first connecting rod and the second connecting rod when there is no sheet on the paper tray.

In a preferred embodiment, the second connecting rod is substantially perpendicular to the pressing part.

In a preferred embodiment, the second connecting rod and the pressing part are formed integrally.

In a preferred embodiment, the sheet stack thickness estimating device further comprises a frame for supporting and holding the sheet stack thickness estimating device, wherein the driving device and the sensor are held on the frame, and the shaft and the frame are formed integrally.

In a preferred embodiment, the sheet stack thickness estimating device further comprises an elastic component disposed on the shaft, and the pressing part has a protrusion at a side thereof, wherein an end of the elastic component connects to the protrusion, and another end of the elastic component connects to the frame.

BRIEF DESCRIPTION OF THE DRAWINGS

FIG. 4 illustrates a schematic view of a sheet stack thickness estimating device applied to an office machine with a subsequence processing device according to a preferred embodiment of the present invention.

DETAILED DESCRIPTION OF THE PREFERRED EMBODIMENT

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

According to a specific embodiment of the present invention, a sheet stack thickness estimating device capable of being applied to an office machine with a subsequence processing device is provided.

Figure 1A:
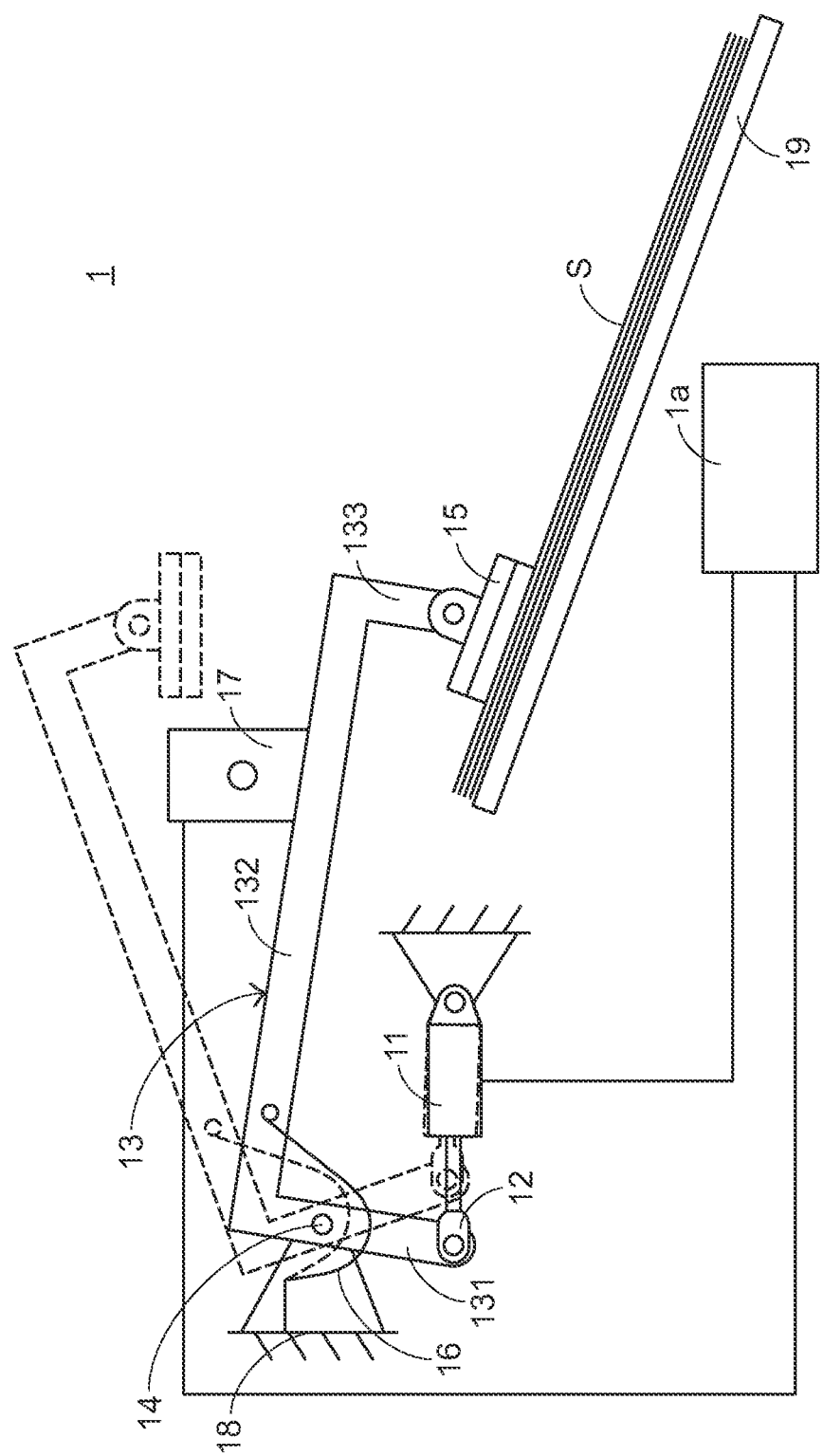
FIG. 1A illustrates a schematic view of a conventional sheet stack thickness estimating device.
Figure 1B:
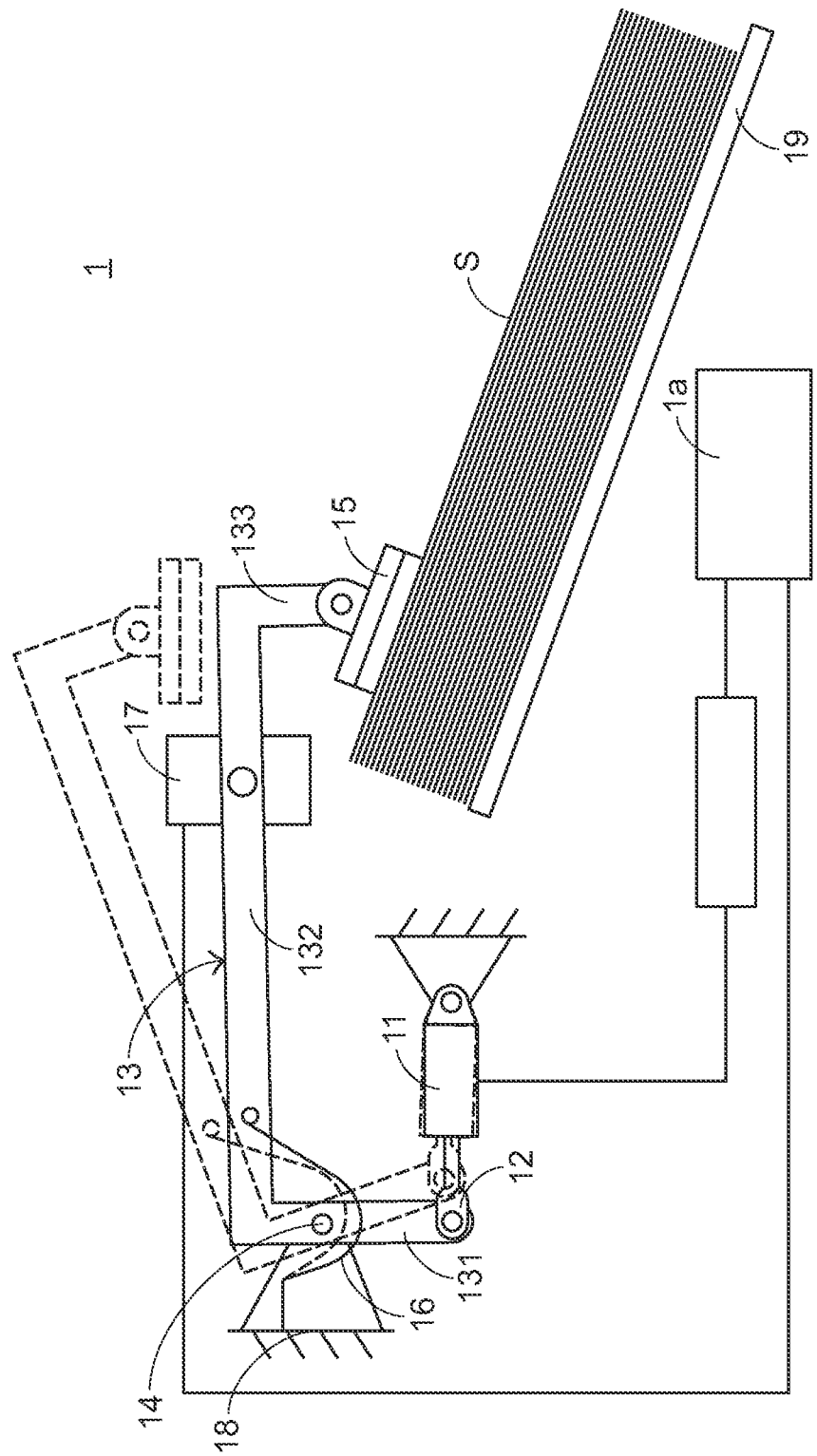
FIG. 1B illustrates a side view of the conventional sheet stack thickness estimating device where a stack of sheets are entered into the paper tray thereof.
Figure 2:
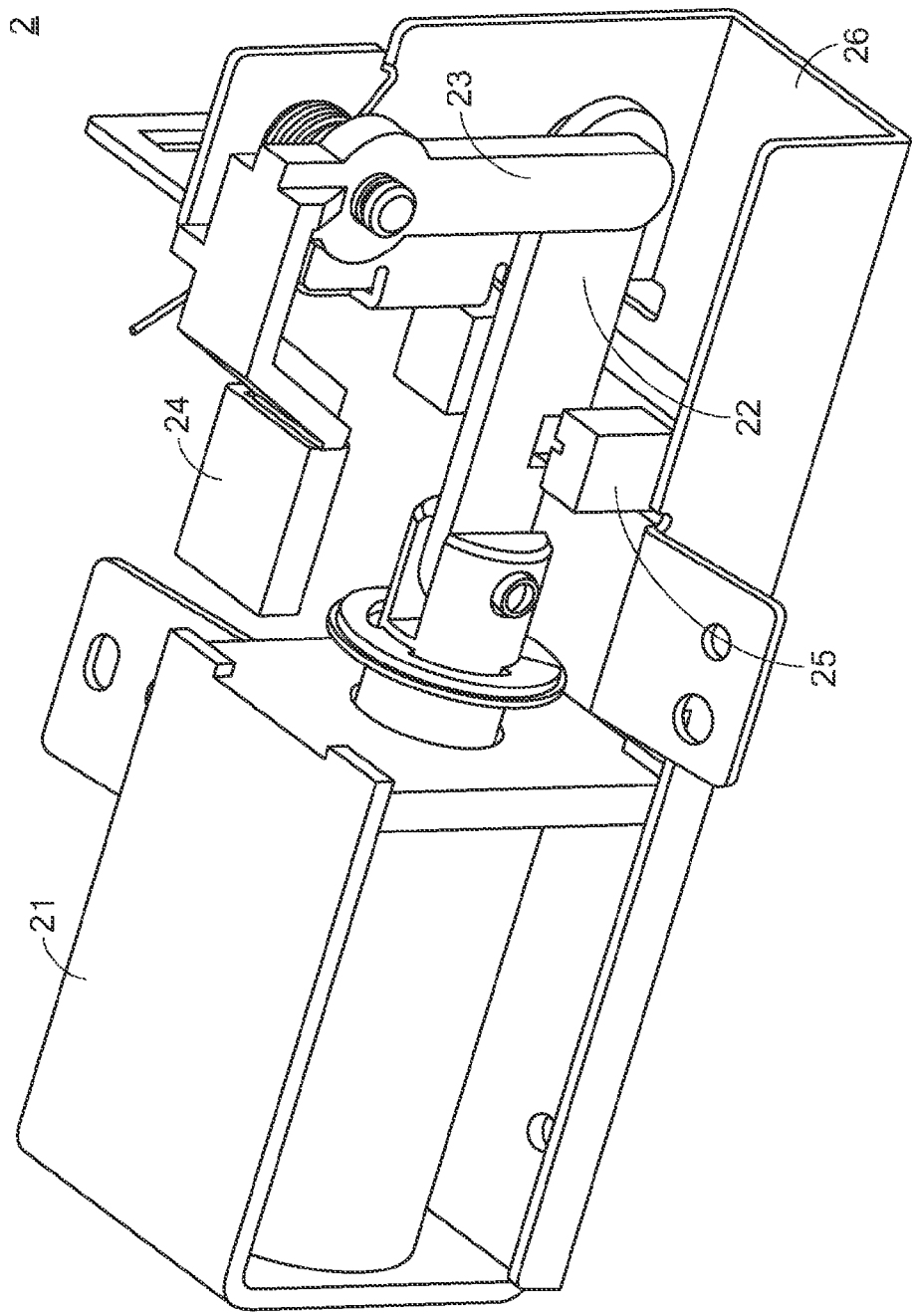
FIG. 2 illustrates a perspective view of a sheet stack thickness estimating device according to a preferred embodiment of the present invention.

FIG. 2 illustrates a perspective view of a sheet stack thickness estimating device according to a preferred embodiment of the present invention. Referring to FIG. 2, the sheet stack thickness estimating device 2 comprises a driving device 21, a first connecting rod 22, a second connecting rod 23, a pressing part 24, a sensor 25 and a frame 26.

Figure 3:
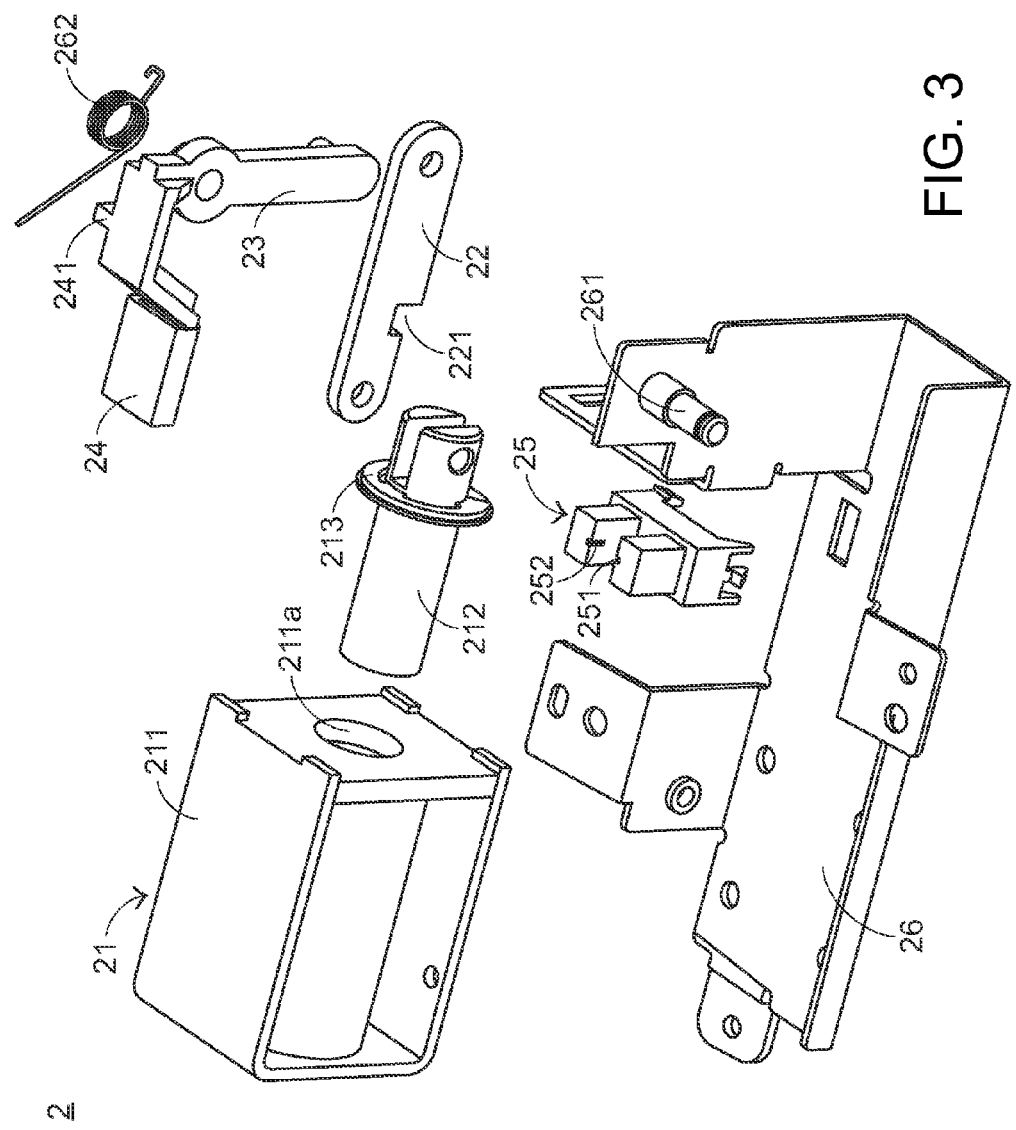
FIG. 3 illustrates an explosion view of a sheet stack thickness estimating device according to a preferred embodiment of the present invention.

FIG. 3 illustrates an explosion view of a sheet stack thickness estimating device according to a preferred embodiment of the present invention. Referring to FIG. 2 and FIG. 3 together, the driving device 21 comprises a coil rack 211, a pillar 212 and a position limiting plate 213. Here, the coil rack 211 has a through hole 211a therein. The first connecting rod 22 has a notch 221. The pressing part 24 has a protrusion 241 at a side thereof. The sensor 25 comprises an emitting end 251 and a receiving end 252. The frame 26 comprises a shaft 261 and an elastic component 262, wherein the shaft 261 and the frame 26 are formed integrally.

An assembling process of a sheet stack thickness estimating device according to a preferred embodiment of the present invention is illustrated herein after. A pillar 212 of a driving device 21 is passed through a through hole 211a of a coil rack 211, an end of the pillar 212 is exposed outside the coil rack 211, and a position limiting plate 213 surrounds the end of the pillar 212. The first connecting rod 22 is connected to the end of the pillar 212 of the driving device 21. A first end of the second connecting rod 23 is connected to the first connecting rod 22, and a second end of the connecting rod 23 is pivoted on a shaft 261 of the frame 26. A pressing part 24 extends from the second end of the second connecting rod 23 and is perpendicular to the second connecting rod 23, and the pressing part 24 and the second connecting rod 23 are formed integrally. An emitting end 251 and a receiving end 252 of a sensor 25 are respectively located at two sides of the first connecting rod 22 and opposite to each other. An elastic component 262 is wind around the shaft 261, an end thereof is connected to a protrusion 241 and another end thereof is connected to the frame 26. In addition, the driving device 21 and the sensor 25 are held on the frame 26.

FIG. 4 illustrates a schematic view of a sheet stack thickness estimating device applied to an office machine with a subsequence processing device according to a preferred embodiment of the present invention. Referring to the FIG. 4 first, an operation theory of the present embodiment is illustrated herein after. The subsequence processing device comprises the sheet stack thickness estimating device 2, a stapler 3 and a paper tray 4. A pressing part 24 of the sheet stack thickness estimating device 2 is exposed on the paper tray 4.

Figure 5A:
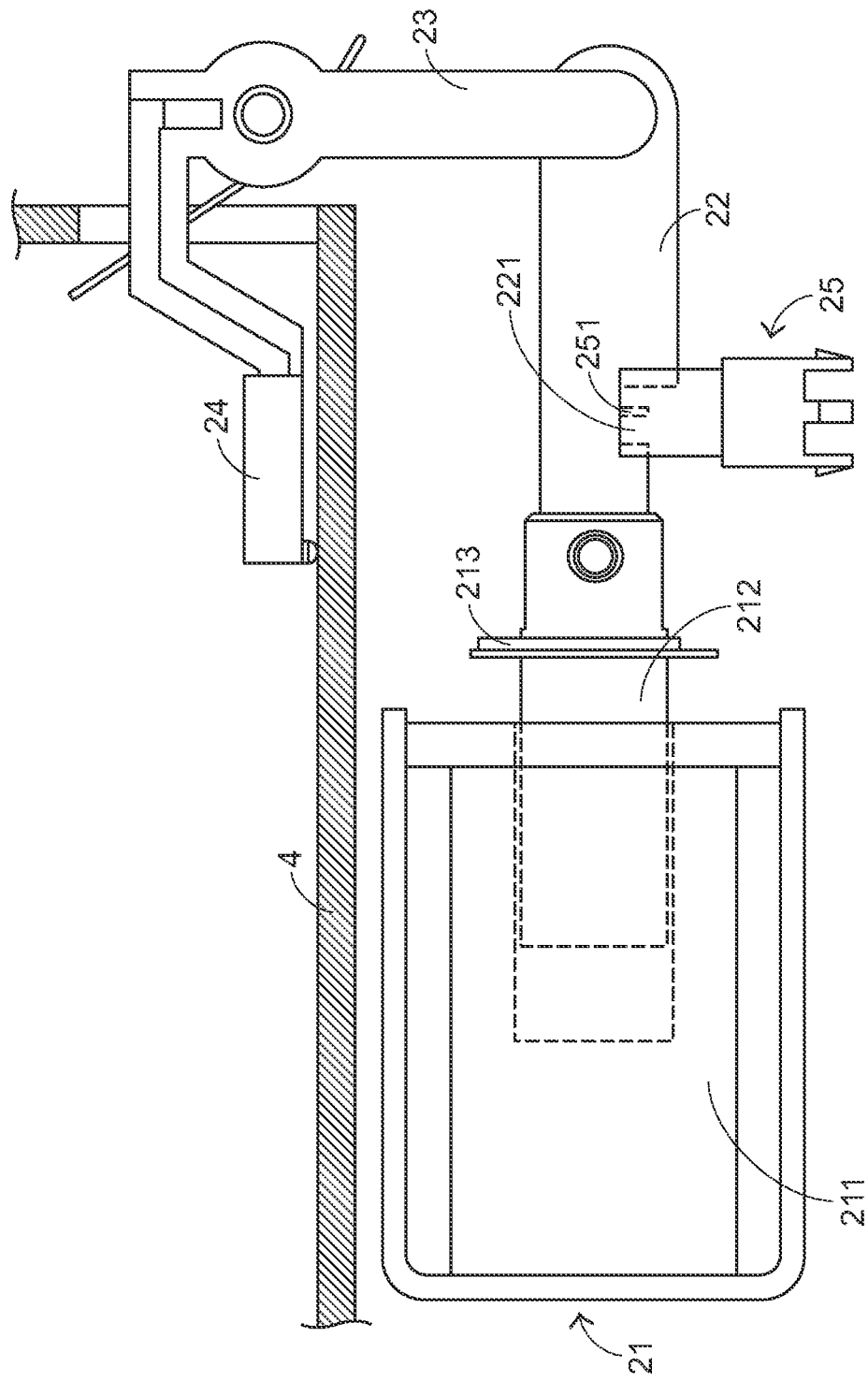
FIG. 5A illustrates a side view of a sheet stack thickness estimating device in a standby state according to a preferred embodiment of the present invention.
Figure 5B:
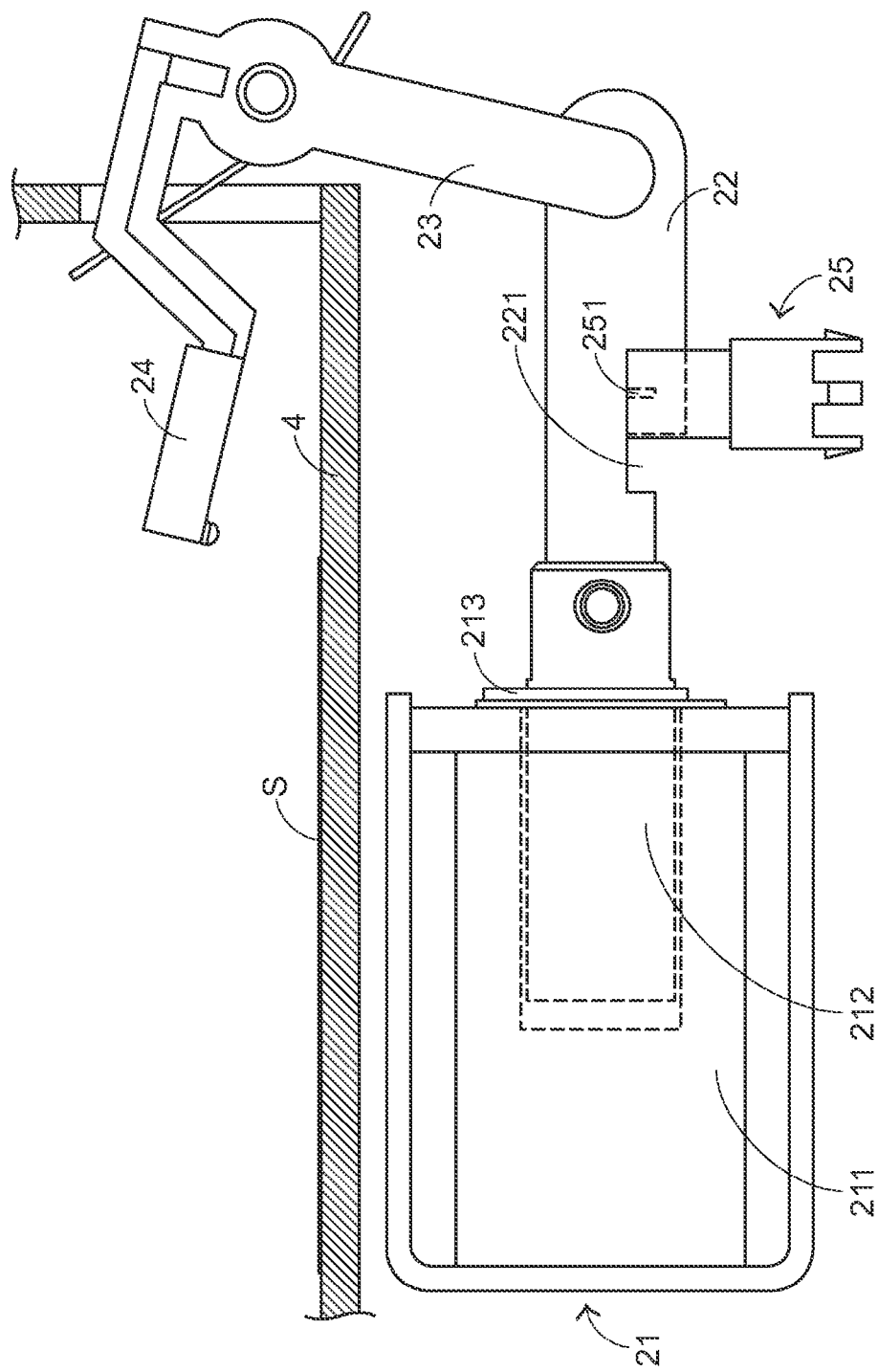
FIG. 5B illustrates a side view of a sheet stack thickness estimating device where a sheet is entering into a paper tray according to a preferred embodiment of the present invention.

FIG. 5A illustrates a side view of a sheet stack thickness estimating device in a standby state according to a preferred embodiment of the present invention, and FIG. 5B illustrates a side view of a sheet stack thickness estimating device where a sheet is entering into a paper tray according to a preferred embodiment of the present invention. Referring to FIG. 5A and FIG. 5B together, the pressing part 24 is pushed by a force provided by the elastic component 262 when the sheet stack thickness estimating device 2 is standby, and thus the pressing part 24 and the second connecting rod 261 rotate about the shaft 261 in the counterclockwise direction until the pressing part 24 leans against the paper tray 4 as shown in FIG. 5A. At this time, the driving device 21 is inactivated. Since the pillar 212 of the driving device 21 is synchronized with the first connecting rod 22 and the second connecting rod 23, the second connecting rod 23 provides an acting force to the first connecting rod 22, so as to bring the pillar 212 to move rightward to a standby position synchronously. At this time, an included angle substantially equal to 90 degrees is formed between the first connecting rod 22 and the second connecting rod 23.

When a sheet S need to be bound is prepared for entering into the paper tray 4, a controller (not shown) controls the driving device 21 to drive the pillar 212 and the first connecting rod 22 connected to the pillar 212 moving horizontally toward the coil rack 211 until the position limiting plate 213 leans against the coil rack 211. At the same time, the second connecting rod 23 is brought to rotate about the shaft 261 in the clockwise direction, so as to raise up the pressing part 24 as illustrated in FIG. 5B to let the sheet S able to enter into the paper tray 4. After whole of the sheet S enters into the paper tray 4, the controller (not shown) stops to drive the driving device 21 to move. At this time, the pressing part 24 and the second connecting rod 23 are pushed by the force provided by the elastic component 262 again to rotate about the shaft 261 in the counterclockwise direction until the pressing part 24 leans against the sheet S on the paper tray 4, so as to maintain the flatness of the sheet for binding. The driving device 21 repeats the above mentioned motions when each sheet S is prepared for entering into the paper tray 4 until all of the sheets S are entered into the paper tray 4.

Figure 5C:
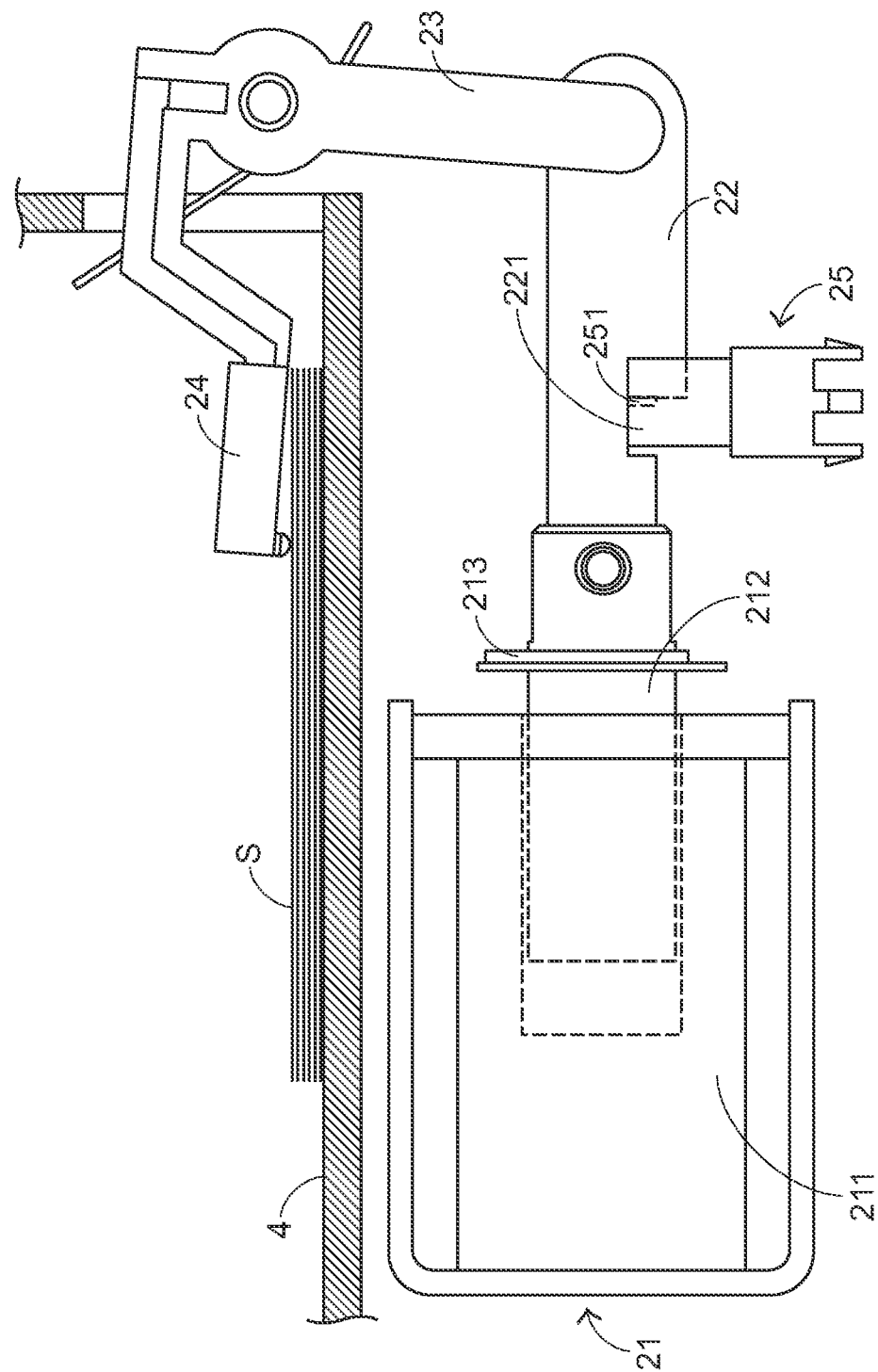
FIG. 5C illustrates a side view of a sheet stack thickness estimating device after a stack of sheets with a thickness lower than a presetting thickness are entered into a paper tray according to a preferred embodiment of the present invention.
Figure 5D:
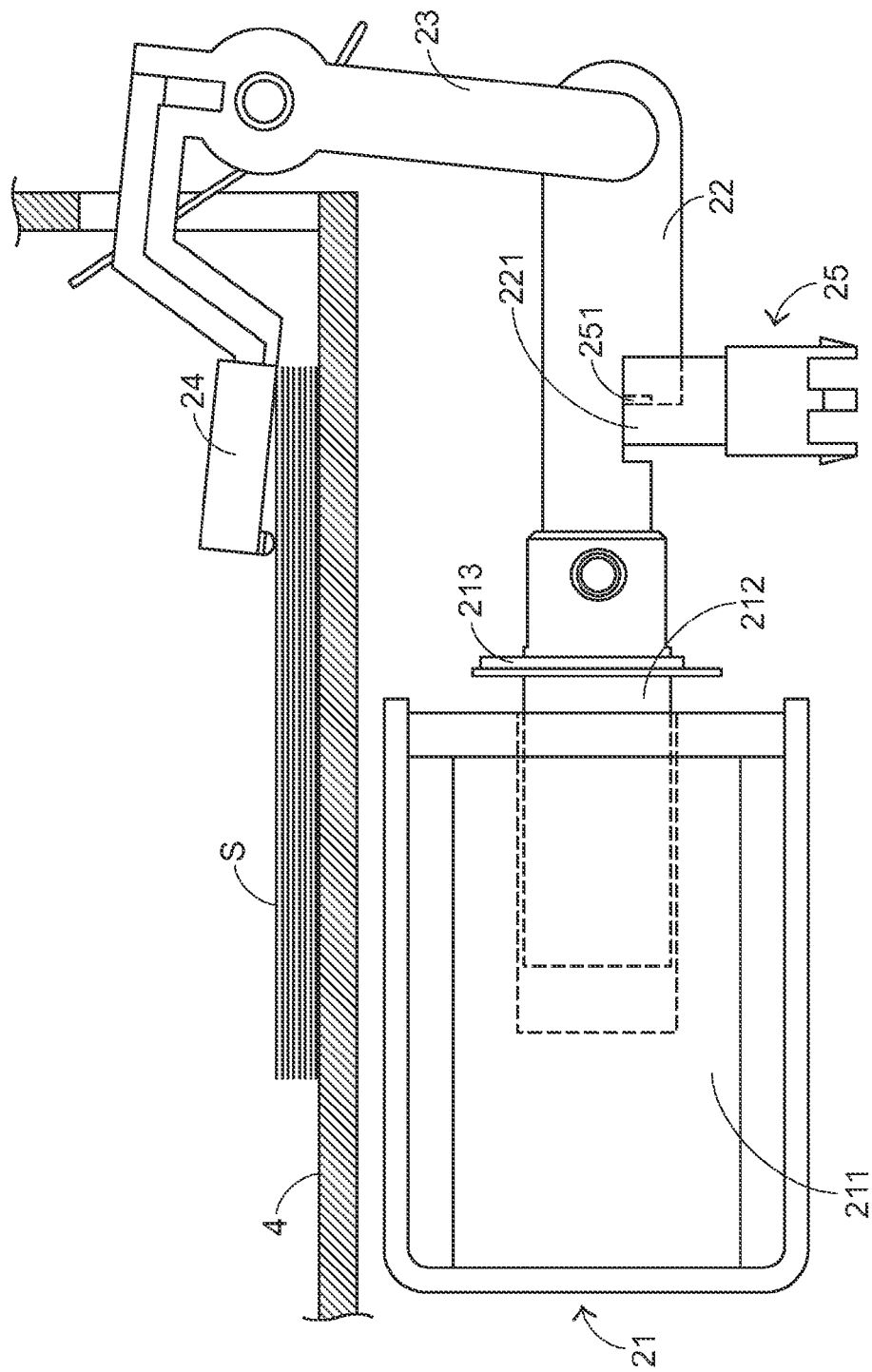
FIG. 5D illustrates a side view of a sheet stack thickness estimating device after a stack of sheets with a thickness thicker than a presetting thickness are entered into a paper tray according to a preferred embodiment of the present invention.

FIG. 5C illustrates a side view of a sheet stack thickness estimating device after a stack of sheets with a thickness lower than a presetting thickness are entered into a paper tray according to a preferred embodiment of the present invention, and FIG. 5D illustrates a side view of a sheet stack thickness estimating device after a stack of sheets with a thickness thicker than a presetting thickness are entered into a paper tray according to a preferred embodiment of the present invention. Referring to FIG. 5C and FIG. 5D, with the number of the sheets S increasing, the total thickness of the sheets S increases. Hence, the pressing part 24 gradually moves far away the paper tray 4, and the first connecting rod 22 moves towards the coil rack 211 due to synchronizing with the second connecting rod 23. As illustrated in FIG. 5C, when a thickness of a stack of sheets S on the paper tray 4 is lower than a presetting thickness, the emitting end 251 of the sensor 25 may transmit a signal passing through the notch 221 of the first connecting rod 22 to the receiving end 252. Therefore, the controller (not shown) determines the thickness of the stack of sheets S is lower than the presetting thickness, and thus the stapler 3 starts to bind the stack of sheets S.

However, as illustrated in FIG. 5D, when a thickness of a stack of sheets S on the paper tray 4 is thicker than the presetting thickness, the first connecting rod 22 interrupts the signal transmitted from the emitting end 251 of the sensor 25. Accordingly, the controller (not shown) determines the thickness of the stack of sheets S is thicker than the presetting thickness, and thus the stapler 3 stops binding.

According to the above mentioned preferred embodiment, it is understood that the sheet stack thickness estimating device 2 is modulized by combining the driving device 21, the first connecting rod 22, the second connecting rod 23, the pressing part 24, the sensor 25 and the frame 26 in the present invention. Therefore, not only the sheet stack thickness estimating device 2 may be applied to office machines with various sizes, but also it is unnecessary to enlarge an installation space due to a location of the sensor. In addition, the probability of misjudgement resulted from the sensor being incompletely interrupted is decreased due to both of the sensor and the first connecting rod are arranged horizontally, so as to increase the accuracy of the sheet stack thickness estimating device and avoid an error process.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A sheet stack thickness estimating device for detecting a thickness of a stack of sheets on a paper tray, comprising:
   a driving device, for providing a motive force to the sheet stack thickness estimating device;
   a first connecting rod, comprising a notch, wherein the first connecting rod connects to the driving device, so as to be driven to move horizontally by the driving device;
   a second connecting rod, wherein a first end of the second connecting rod connects to the first connecting rod and is synchronized with the first connecting rod, and a second end of the second connecting rod is pivoted to a shaft and is capable of rotating about the shaft;
   a pressing part, for pressing the stack of sheets on the paper tray, wherein the pressing part is extended from the second end of the second connecting rod; and
   a sensor, comprising an emitting end and a receiving end, wherein the emitting end and the receiving end are respectively located at two side of the first connecting rod.

2. The sheet stack thickness estimating device as claimed in claim 1, wherein the driving device comprises a coil rack, a pillar and a position limiting plate, the coil rack has a through hole therein, the pillar is inserted inside the through hole of the coil rack with an end of the pillar exposed outside the coil rack, and the position limiting plate surrounds the end of the pillar.

3. The sheet stack thickness estimating device as claimed in claim 1, wherein an included angle substantially equal to 90 degrees is formed between the first connecting rod and the second connecting rod when there is no sheet on the paper tray.

4. The sheet stack thickness estimating device as claimed in claim 1, wherein the second connecting rod is substantially perpendicular to the pressing part.

5. The sheet stack thickness estimating device as claimed in claim 1, wherein the second connecting rod and the pressing part are formed integrally.

6. The sheet stack thickness estimating device as claimed in claim 1, further comprising a frame for supporting and holding the sheet stack thickness estimating device, wherein the driving device and the sensor are held on the frame, and the shaft and the frame are formed integrally.

7. The sheet stack thickness estimating device as claimed in claim 6, further comprising an elastic component disposed on the shaft, and the pressing part has a protrusion at a side thereof, wherein an end of the elastic component connects to the protrusion, and another end of the elastic component connects to the frame.

* * * * *